W. L. GILMORE AND T. P. WRIGHT.
AEROPLANE WING STRUCTURE.
APPLICATION FILED MAY 22, 1922.
1,437,469.
Patented Dec. 5, 1922.
2 SHEETS—SHEET 1.
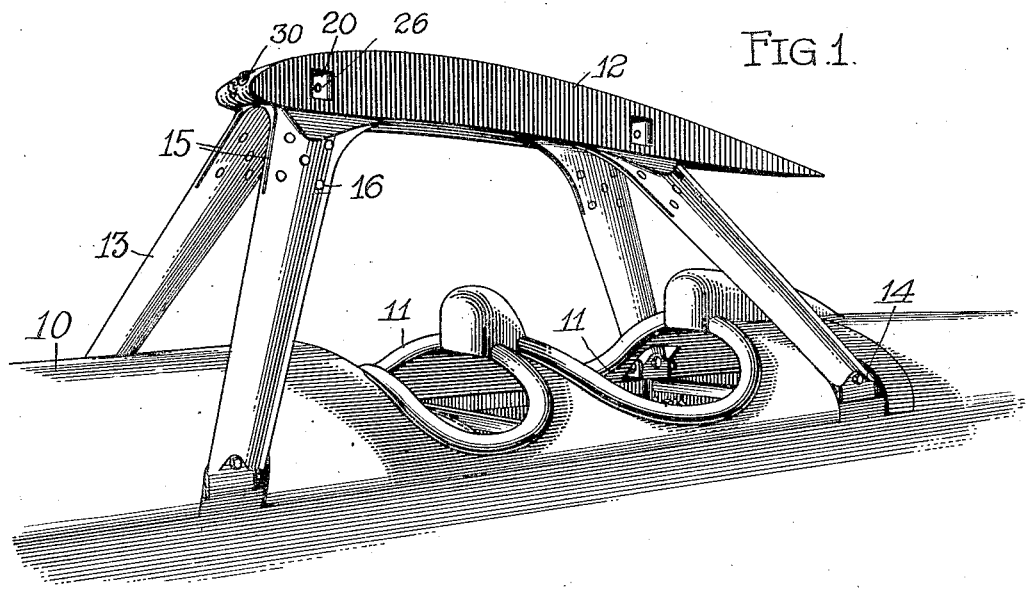
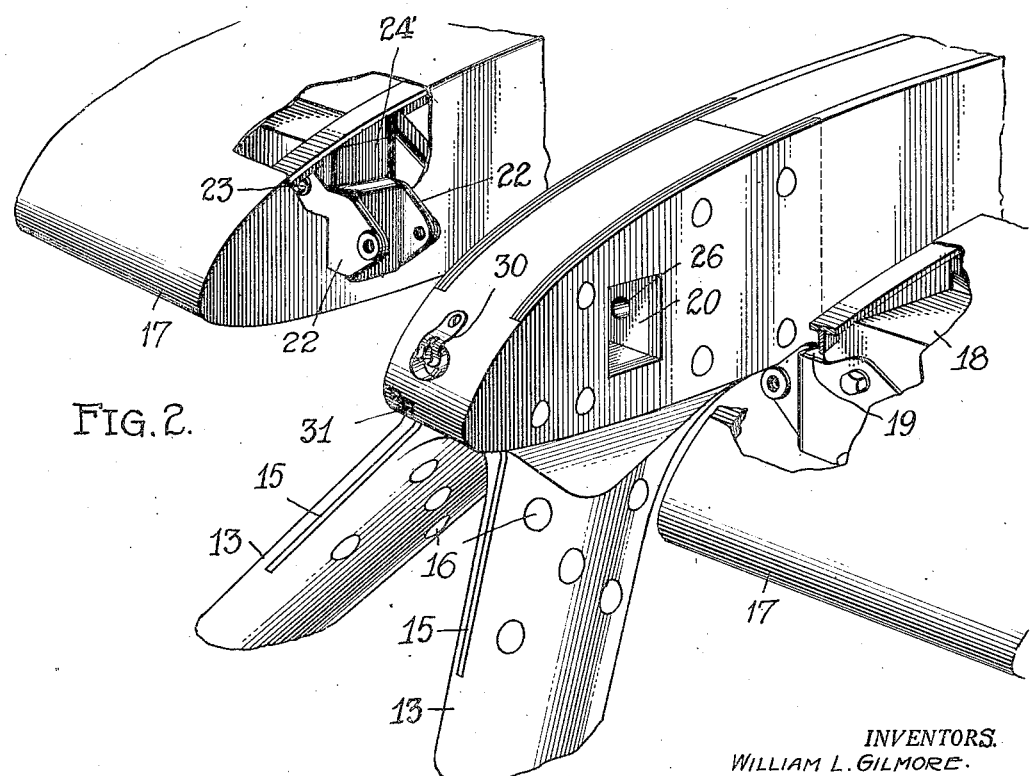
INVENTORS.
WILLIAM L. GILMORE.
THEODORE P. WRIGHT.
BY
ATTORNEY

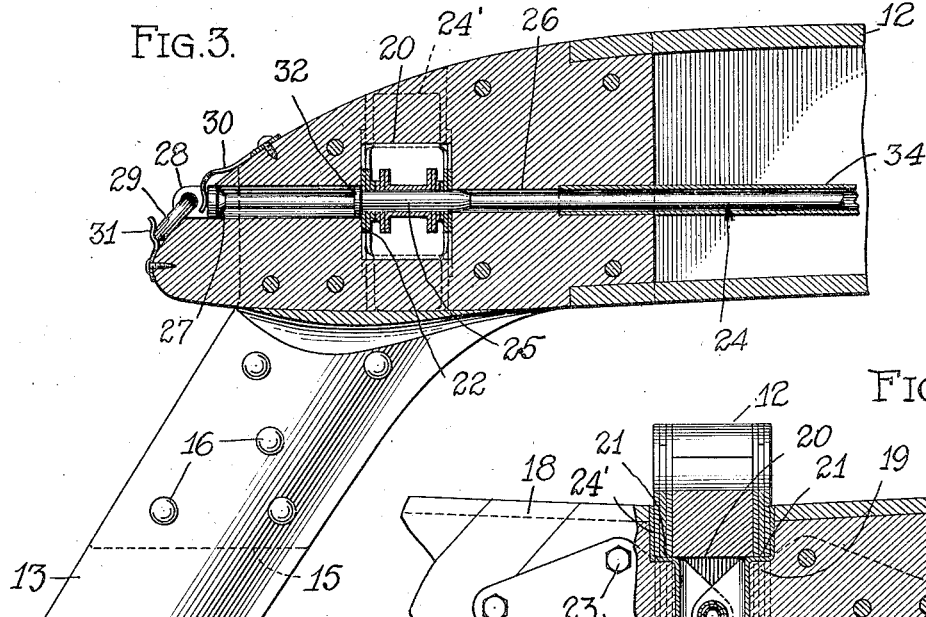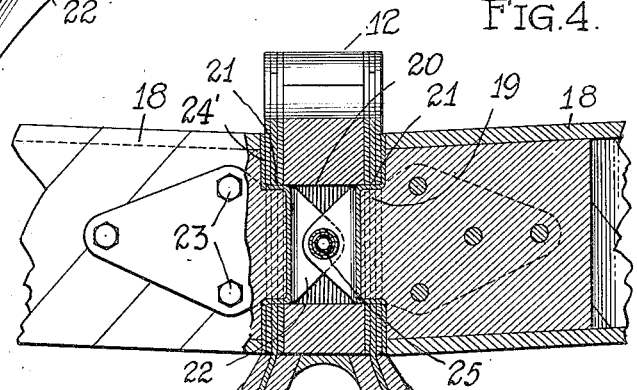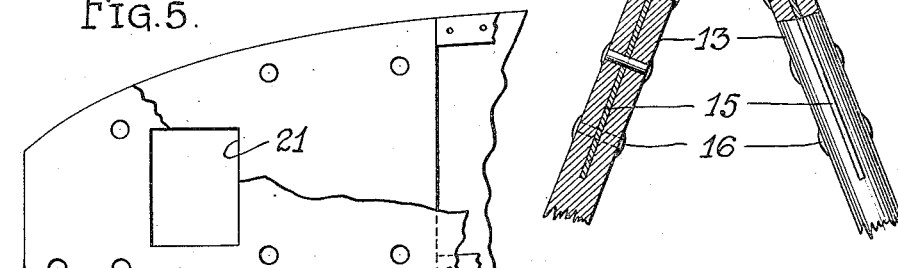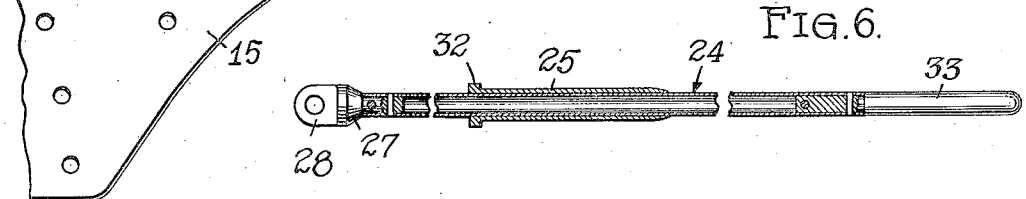

Patented Dec. 5, 1922.

1,437,469

UNITED STATES PATENT OFFICE.

WILLIAM L. GILMORE, OF PORT WASHINGTON, AND THEODORE P. WRIGHT, OF GARDEN CITY, NEW YORK, ASSIGNORS TO CURTISS AEROPLANE AND MOTOR CORPORATION, OF GARDEN CITY, LONG ISLAND, NEW YORK, A CORPORATION OF NEW YORK.

AEROPLANE WING STRUCTURE.

Application filed May 22, 1922. Serial No. 562,586.

*To all whom it may concern:*

Be it known that we, WILLIAM L. GILMORE and THEODORE P. WRIGHT, citizens of the United States, residing at Port Washington and Garden City, respectively, in the county of Nassau and State of New York, have invented certain new and useful Improvements in Aeroplane Wing Structures, of which the following is a specification.

Our invention relates to aeroplanes and more particularly to improvements in the construction and arrangement of parts embodied in aeroplane wing structures.

An object of the invention is to so construct the wings and wing struts of an aeroplane that certain brace wires heretofore considered essential are entirely eliminated; such elimination being desirable, especially in the vicinity of the cockpit space, that the occupant or occupants thereof may obtain better vision, and if a military craft, an unobstructed gun fire range, both laterally and fore and aft.

A further object of the invention is to so construct and arrange the wing panels and wing fittings that the assembly thereof is rendered comparatively easy. Preferably the panels comprised in a given supporting surface are so organized and the hinge fittings so constructed that the outer panels are direct-connected and the hinge fittings completely hidden within the center panel confines. Such an arrangement is instrumental in reducing the total number of fitting parts, in proportionately reducing the weight of the machine, in correspondingly decreasing the head resistances, and in according the wing structure an increased factor of safety due to a better distribution of the stresses set up in the wings.

A still further object of the invention is to eliminate the shear load on the wing hinge fittings by extending the inner beam ends of the outer panel into openings formed in the center panel, which openings, as will be hereinafter explained, are preferably coincident with openings formed in plates embedded respectively in the center panel and in the ends of the struts which constitute the center panel support.

Other objects and advantages will be noted upon a fuller understanding of the invention.

In the drawings:

Figure 1 is a perspective view of a portion of an aeroplane constructed in accordance with the present invention;

Figure 2 is a detail perspective view of a portion of the center panel, as well as a portion of the outer panels, showing the relation of the one to the other;

Figure 3 is a longitudinal vertical sectional view of the forward portion of the center panel;

Figure 4 is a transverse vertical sectional view of the center panel showing the outer panel hinge connection;

Figure 5 is a fragmentary side elevation of the forward portion of the center panel with portions broken away; and, Figure 6 is a longitudinal sectional view of the hinge pin.

In the embodiment of the invention selected for illustration, the fuselage of the aeroplane is designated as 10. Intermediately of its ends the fuselage is provided with cockpit space 11. Directly above the cockpit space 11 the center panel 12 of the upper supporting surface is located. Said center panel is preferably supported in its elevated position by means of a plurality of wing struts 13 disposed respectively fore and aft of the cockpit space, the struts collectively being upwardly convergent and defining a pyramid somewhat elongated in side elevation. The struts 13 at their lower ends are fastened in any conventional manner, as indicated at 14, to the fuselage and at their upper ends are made an integral part of the center panel that certain wiring heretofore considered essential might be eliminated. Through the elimination of such wiring, as hereinbefore explained, the occupants of the cockpit space have a better range of vision as well as an unobstructed gun fire range if the aeroplane is designed for military use.

Instead of the conventional fore and aft wiring the struts 13 at their outer ends have embedded therein plates 15, each of which for a considerable portion of its area is likewise embedded in the structure of the center panel. Rivets 16 extend transversely through the center panel on the one hand and through each of the several struts 13 on the other hand, to provide a suitable fastening by means of which the plates 15 are held in place.

In addition to the center panel 12, outer panels 17 are provided. These panels 17 are disposed respectively on opposite sides of the center panel, and when fastened in place, abut the opposite faces of the center panel as indicated in Figure 4. Each outer panel 17 includes as a part of its structural framework a front wing beam 18 and a rear wing beam (not shown). Each beam 18 at its inner end is provided with an integral projection 19 which is adapted to fit an opening 20 formed in the center panel. The opening 20 within which the projections 19 of the front wing beam engage, and also the opening 20 within which the projections (not shown) of the rear wing beam engage, are heavily reenforced by the plates 15 heretofore mentioned. The plates 15, in each instance, are provided with openings 21 coincident with the openings 20 of the panel.

Instead of separately fastening the outer panels 17 to the opposite faces of the center panel 12, said outer panels are direct-connected, the connections (two separate connections being provided) in each instance fitting the openings 20 of the center panel. Each connection comprises opposed hinge plates 22—22 which are fastened as at 23 against the opposite faces of the wing beams. Such hinge plates are reenforced by an end plate 24 which bears against the end of the wing beam with which it is associated, and, as indicated in Figure 4, complements the beam end so that it too enters the opening 20. The mating hinge parts of the opposed beam ends are in each instance fastened together by a hinge pin 24 common to both or all hinge connections. Thus constructed, it is obvious that the shear load which would otherwise be borne entirely by the hinge plate fastenings 23 is, as a result of the particular arrangement herein adopted, borne entirely by the heavily reenforced center panel.

The hinge pin 24 (see Figure 6) is preferably hollow throughout the major portion of its length and intermediately of its ends is reenforced as at 25, such reenforced portion being in engagement with the hinge members carried by the front wing beams of the outer panels. Centrally, the center panel, in a fore and aft direction, is provided with an opening 26 within which the hinge pin 24 is fitted, said hinge pin at its forward end being enlarged as at 27 and provided with an eye 28 and a ring 29, the latter affording a positive means enabling the hinge pin withdrawal. Springs 30 and 31 jointly serve to hold the hinge pin in place.

In addition to the enlargement 27 of the hinge pin an enlargement 32 is provided. This enlargement 32 provides a stop which, when in engagement with the forward hinge plate 22 of the hinge connection, signifies that the reenforced portion 25 of the pin is properly related to the forward hinge connection and the solid portion 33 of the pin is properly related to the rear hinge connection. A guide tube 34, inside the center panel, centers the hinge pin during its insertion.

It will be observed from the foregoing that though three panels are provided, but two hinge connections are required, said connections being disposed respectively in line with the forward and rear wing beams of the outer panels. Accordingly the number of hinge parts is reduced by half. It will be further noted that the wing hinge fittings are completely hidden within the confines of the center panel and that the one hinge pin 24 is common to the total number of hinge connections. By the use of the one hinge pin, assembly is made easy and a proper lining up of the opposed outer panels assured.

While we have described our invention in detail in its present preferred embodiment, it will be obvious to those skilled in the art after understanding our invention, that various changes and modifications may be made therein without departing from the spirit or scope thereof. We aim in the appended claims to cover all such modifications and changes.

What is claimed is:—

1. In an aeroplane, a supporting surface including a center panel, a wing strut, and a connecting plate embedded at its opposite ends respectively in the center panel and in the wing strut.

2. In an aeroplane, a fuselage having cockpit space therein for one or more of the flying crew, a supporting surface including a center panel positioned directly over the cockpit space, wing struts fastened to the fuselage and positioned respectively fore and aft of the cockpit space to provide a center panel support, and plates embedded respectively in the outer strut ends and in the center panel, the relation of the plates to the struts and to the center panel being such that wiring as a brace means for the center panel is unnecessary.

3. In an aeroplane, a fuselage having cockpit space therein for one or more of the flying crew, a supporting surface including a center panel positioned directly over the cockpit space, wing struts fastened to the fuselage and positioned respectively fore and aft of the cockpit space to provide a substantially pyramidal support for the center panel, and plates embedded respectively in the outer strut ends and in the center panel, the relation of the plates to the struts and to the center panel being such that wiring as a brace means for the center panel is unnecessary.

4. In an aeroplane, a supporting surface including a center panel having an opening formed therein, outer panels arranged respectively at opposite sides of the center panel, and a hinge connection between said outer panels extended through said opening.

5. In an aeroplane, a supporting surface including a center panel, outer panels arranged respectively at opposite sides of the center panel, longitudinally spaced hinge connections between the opposed outer panels enclosed within said center panel, and a hinge pin common to the spaced hinged connections.

6. In an aeroplane, a supporting surface including a center panel having an opening formed therein, outer panels arranged respectively at opposite sides of the center panel, projections formed on the inner ends of said outer panel and engaging in said opening, and a hinge connection between said outer panels in line with said projections.

7. In an aeroplane, a supporting surface including a center panel having an opening formed therein, outer panels arranged respectively at opposite sides of said center panel, a wing beam incorporated in the structure of each outer panel, projections formed on the inner beam ends to fit said opening, and a hinge connection between the beam end projections for holding said outer panels aligned.

8. In an aeroplane, a supporting surface including a center panel having openings formed therein, outer panels arranged respectively at opposite sides of said center panel, wing struts providing a support for said center panel, plates embedded respectively in the outer strut ends and in the center panel, each of said plates being provided with an opening coincident with one of said openings in the center panel, and hinge members fastened to the inner ends of the outer panel for fastening said panels together, the hinge connections in each instance being extended through the plate openings for the purpose specified.

9. In an aeroplane, a center panel, outer panels arranged respectively at opposite sides of the center panel, longitudinally separated hinge connections between the outer panels enclosed for the major part within the confines of the center panel, and a longitudinally continuous hinge pin common to both or all of the hinge connections.

10. In an aeroplane, a center panel having an opening formed therein, outer panels arranged respectively at opposite sides of said center panel, a wing strut, a plate embedded in the wing strut, said plate being provided with an opening coincident with the opening in the center panel, and a hinge connection between the outer panels enclosed in the center panel, said hinge connection being extended through the opening formed in said plate.

11. In an aeroplane, a supporting surface including spaced outer panels, a direct hinge connection between said outer panels, and a center panel of a construction such that the space between the outer panels is completely filled and the hinge connections therebetween wholly enclosed within its confines.

In testimony whereof we hereunto affix our signatures.

WILLIAM L. GILMORE.
THEODORE P. WRIGHT.